United States Patent [19]
Eberson et al.

[11] Patent Number: 6,150,761
[45] Date of Patent: Nov. 21, 2000

[54] DISCHARGE LAMP BALLAST CIRCUIT WITH CHARGE PUMP IGNITER

[75] Inventors: Etienne N. K. P. M. Eberson; Antonius A. M. Marinus, both of Eindhoven, Netherlands

[73] Assignee: U.S. Philips Corporation, New York, N.Y.

[21] Appl. No.: 09/400,760

[22] Filed: Sep. 21, 1999

[30] Foreign Application Priority Data

Sep. 21, 1998 [NL] Netherlands ............... 98203151

[51] Int. Cl.⁷ ....................................... H01J 7/44
[52] U.S. Cl. ........................... 315/61; 315/59; 315/205; 315/237; 315/307; 315/DIG. 5
[58] Field of Search .............. 315/205, 209 R, 315/237, 240, 241 R, 307, 308, 291, DIG. 5, 71–74, 56, 58, 59, 61, 62; 323/282, 351, 290, 224

[56] References Cited

U.S. PATENT DOCUMENTS

| | | | |
|---|---|---|---|
| 3,875,459 | 4/1975 | Remery et al. | 315/205 |
| 5,581,161 | 12/1996 | Gong | 315/307 |
| 5,942,883 | 8/1999 | Preis et al. | 323/282 |
| 5,955,841 | 9/1999 | Moisin et al. | 315/56 |

*Primary Examiner*—Haissa Philogene
*Attorney, Agent, or Firm*—Bernard Franzblau

[57] ABSTRACT

A ballast for a compact fluorescent lamp includes a down-converter for operating the lamp with a DC current during stable operation and a charge pump for igniting the lamp. The converter includes an inductor and a first series circuit of a first diodie and a first switching element. An output capacitor shunts the lap terminals. The charge pump includes a second series circuit of second diodie and a second switching element coupled to the lamp terminals with the second diode polarized to prevent the discharge of the output capacitor when the second switching element is conductive. The inductor cooperates with the first and second diodes and the second switching element to build up the voltage across the outpout capacitor to the ignition voltage level of the lamp.

20 Claims, 2 Drawing Sheets

DISCHARGE LAMP BALLAST CIRCUIT WITH CHARGE PUMP IGNITER

BACKGROUND OF THE INVENTION

The invention relates to a circuit arrangement for igniting and supplying a lamp with a DC current, comprising
- input terminals for connection to terminals of a power supply source supplying a DC voltage,
- a DC/DC converter coupled to the input terminals and provided with
- an inductive element,
- a first unidirectional element,
- a first switching element,
- a control circuit coupled to a control electrode of the first switching element for rendering the first switching element conducting and non-conducting at a frequency f,
- output terminals for connecting the lamp, and
- an output capacitance shunting the lamp during operation, and comprising
- a first branch connecting the output terminals during operation and comprising a second switching element and means for rendering the second switching element conducting and non-conducting.

The invention also relates to a compact lamp.

A circuit arrangement as described in the opening paragraph is known from U.S. Pat. No. 5,581,161. In the known circuit arrangement, the DC/DC converter is a down-converter. Immediately after the known circuit arrangement is put into operation, both the first and the second switching element are conducting. During operation of the known circuit arrangement, both a first and a second lamp electrode form part of the first branch. The inductive element and the first branch convey a current during a first time interval, so that the electrodes of the lamp connected to the circuit arrangement are preheated. At the end of the first time interval, the second switching elements rendered non-conducting so that the first branch no longer conveys any current. The inductive element subsequently charges the output capacitance via the first unidirectional element, which output capacitance supplies the lamp with an ignition voltage. After igniting the lamp, during stationary (i.e. stable) operation, the control circuit renders the first switching element high-frequency conducting and non-conducting, and a lamp connected to the circuit arrangement is fed with a DC current supplied by the down-converter. Since the down-converter consists of only a small number of components, the known circuit arrangement can be manufactured relatively easily and is thus inexpensive. A drawback of the known circuit arrangement is, however, that the ignition voltage generated at the end of the first time interval has only a relatively small amplitude so that the lamp does not easily ignite. In the known circuit arrangement, the second switching element is constituted by a glow discharge starter. If the lamp does not ignite immediately, the glow discharge starter will successively become conducting and non-conducting a number of times, while an ignition voltage is generated across the output capacitance every time after the glow discharge starter has become non-conducting. It has been found in practice that, dependent on the specific properties of the relevant lamp, the ignition of the lamp is only successful after a number of attempts or, in the worst case, fails completely.

SUMMARY OF THE INVENTION

It is an object of the invention to provide a relatively simple and, hence, inexpensive circuit arrangement for igniting and supplying a lamp with a DC current, with which the lamp can be ignited in an efficient and reliable manner.

According to the invention, a circuit arrangement as described in the opening paragraph is therefore characterized in that the first branch is also provided with a second unidirectional element.

Due to the presence of the second unidirectional element, the output capacitance is not discharged via the second switching element when this switching element becomes conducting again. Consequently, when the second switching element becomes non-conducting again, the inductive element charges the output capacitance to a higher voltage than was reached during the previous period of non-conductance of the second switching element. It is thus achieved that, after the second switching element has become conducting and non-conducting a relatively small number of times, a voltage with a relatively high amplitude can be obtained across the output capacitance. It has been found that lamps of various properties have a good ignition behavior if they are ignited by means of a circuit arrangement according to the invention.

The first switching element is preferably rendered conducting and non-conducting by the control circuit in such a way that the inductive element conveys a continuous current prior to ignition of the lamp. Good results have also been found for embodiments of a circuit arrangement according to the invention in which the circuit arrangement is provided with a circuit component for decreasing the frequency f after ignition of the lamp. If the frequency at which the first switching element is rendered conducting and non-conducting is relatively high prior to ignition, the minimal value of the amplitude of this continuous current is relatively high. Consequently, the inductive element has a relatively large amount of energy at any moment, so that the voltage across the output capacitance increases to a relatively strong extent when the second switching element becomes non-conducting, even if the second switching element becomes non-conducting when the amplitude of the current through the inductive element is approximately minimal. However, after ignition of the lamp, a high value of the frequency at which the first switching element is rendered conducting and non-conducting may give rise to relatively high losses.

Good results have been achieved with embodiments of a circuit arrangement according to the invention in which the DC/DC converter comprises a down-converter.

The first and the second unidirectional element may be realized in a relatively simple and, hence, inexpensive manner if the first and the second unidirectional element each comprise a diode.

In order to generate an ignition voltage with a relatively high amplitude, the second switching element of a circuit arrangement according to the invention must become successively conducting and non-conducting a number of times. It is possible to implement the second switching element as a semiconductor switching element and to realize the means for rendering this semiconductor switching element successively conducting and non-conducting by means of a second control circuit which is coupled to a control electrode of the semiconductor switching element. However, if the second switching element is implemented as a glow discharge starter, a separate control circuit is not necessary for realizing the successive conducting and non-conducting states of the second switching element. The circuit arrangement thus comprises a relatively small number of components and can therefore be manufactured relatively easily and at low cost.

To improve the ignition behavior of a lamp operated by means of a circuit arrangement according to the invention, it is possible to implement the circuit arrangement in such a way that the first branch comprises a lamp electrode during operation.

When the first switching element is conducting, the current flowing through the first branch also flows through this lamp electrode so that it is pre-heated. Since the lamp is fed with a DC current after ignition, a considerable improvement of the ignition behavior can be realized if only the lamp electrode, constituting the cathode of the lamp during stationary lamp operation, is pre-heated.

It has been found that, in dependence upon the specific properties of the lamp operated by means of a circuit arrangement according to the invention, it may be desirable to provide the circuit arrangement also with a voltage multiplier. This voltage multiplier is fed with an AC voltage and generates a voltage whose amplitude is several times the maximum amplitude of the AC voltage. This voltage generated by the voltage multiplier results in an improvement of the take-over behavior of the lamp. Take-over is herein understood to be the phase of the lamp operation between ignition and stationary operation of the lamp.

It has also been found that a circuit arrangement according to the invention is particularly suitable for use in the ballast circuit of a compact lamp comprising a light-transmissive discharge vessel having a filling of rare gas, and two electrodes, a lamp housing secured to the discharge vessel, a lamp base provided with electric contacts and secured to the lamp housing, and a ballast circuit coupled between the contacts and the electrodes for generating a lamp current from a power supply voltage.

More particularly, a circuit arrangement according to the invention may be eminently used in the ballast circuit of a compact fluorescent lamp, or a lamp whose discharge vessel filling contains mercury and a wall of the discharge vessel has a luminescent coating.

BRIEF DESCRIPTION OF THE DRAWINGS

These and other aspects of the invention are apparent from and will be elucidated with reference to the embodiments described hereinafter.

In the drawings.

DESCRIPTION OF THE PREFERRED EMBODIMENTS

Figure 1:
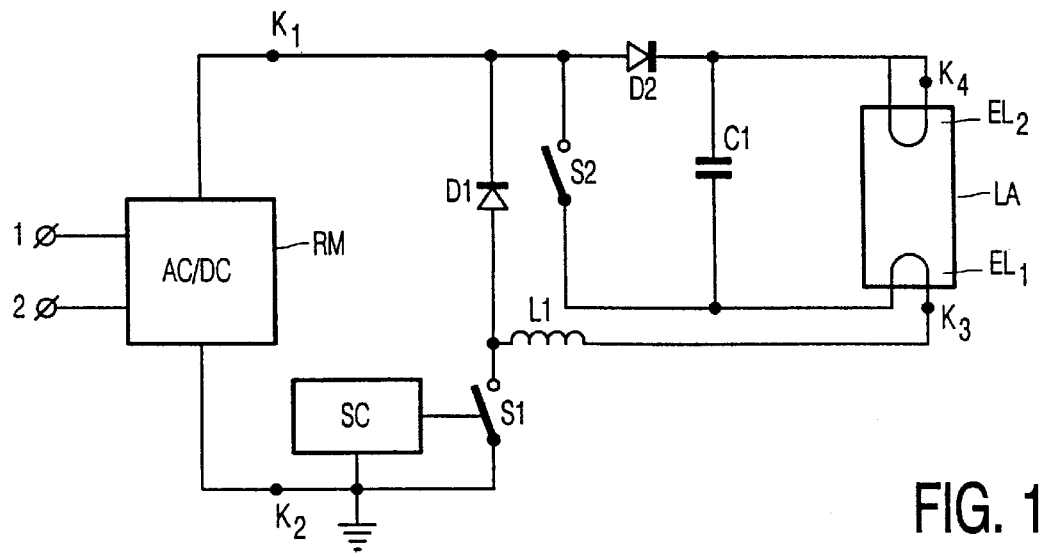
FIG. 1 shows diagrammatically a first embodiment of a circuit arrangement according to the invention, with a lamp connected thereto.

In FIG. 1, the reference numerals 1 and 2 denote terminals for connection to an AC voltage source. Terminals 1 and 2 are connected to respective inputs of circuit component RM for generating a DC power supply voltage from an AC voltage supplied by the AC voltage source. K1 and K2 are input terminals for connection to the terminals of a power supply source supplying a DC voltage. In this embodiment, this power supply source is constituted by the AC voltage source together with the circuit component RM. Input terminals K1 and K2 are connected to respective output terminals of the circuit component RM. Input terminal K1 is connected to input terminal. K2 by means of a series arrangement of diode D1 and switching element S1, constituting, in this embodiment, first unidirectional means and a first switching element, respectively. A control electrode of switching element S1 is coupled to an output of a circuit component SC which constitutes a control circuit for rendering the switching element S1 conducting and non-conducting. Diode D1 is shunted by a series arrangement of glow discharge starter S2, a first lamp electrode E11 of lamp LA and a coil L1. In this embodiment, glow discharge starter S2 constitutes a second switching element together with means for rendering the second switching element conducting and non-conducting. Coil L1 constitutes an inductive element. Glow discharge starter S2 is shunted by a series arrangement of diode D2 and capacitor C1, constituting second unidirectional means and an output capacitance, respectively. A common point of diode D2 and capacitor C1 is connected to a first end of a second lamp electrode E12. A second end of second lamp electrode E12 is connected to an output terminal K4 for connecting the lamp. A second output terminal K3 for connecting the lamp is shown diagrammatically as a common point of the first lamp electrode E11 and coil L1. Switching element S1, circuit component SC, diode D1, coil L1, capacitor C1 and output terminals K3 and K4 jointly constitute a DC/DC converter of the down-converter type.

The embodiment shown in FIG. 1 operates as follows.

If terminals 1 and 2 are connected to terminals of an AC voltage source, the circuit component RM generates a DC power supply voltage from an AC voltage supplied by the AC voltage source, which DC power supply voltage is present between input terminals K1 and K2. As long as the lamp is not yet ignited, the glow discharge starter successively becomes alternately conducting and non-conducting, while switching element S1 is rendered conducting and non-conducting by the circuit component SC at the frequency f. When the glow discharge starter and the switching element S1 are conducting, a current flows from input terminal K1 to input terminal K2 via the glow discharge starter S2, the first lamp electrode E11, coil L1 and switching element S1. When the glow discharge starter S2 is conducting and switching element S1 is non-conducting, a current flows from a first end of coil L1 via diode D1, the glow discharge starter and first lamp electrode E11 to a second end of coil L1. The frequency f and the duty cycle with which the circuit component SC renders the switching element S1 conducting are chosen to be such that the current in coil L1 is a continuous current with a relatively high minimal amplitude. After the glow discharge starter S2 has become non-conducting, a current flows from a first end of coil L1 to a second end of coil L1 via diode D1, diode D2, capacitor C1 and first lamp electrode E11. Capacitor C1 is charged by this current. When the glow discharge starter S2 becomes subsequently conducting again, capacitor C1 is not discharged thanks to the presence of diode D2. When the glow discharge starter S2 subsequently becomes non-conducting again, capacitor C1 is further charged to a higher voltage. This cycle is repeated until the voltage across capacitor C1 is high enough to ignite the lamp. After ignition of the lamp, means (not shown in FIG. 1) ascertain that the lamp conveys a current, whereafter the control circuit SC decreases the frequency f at which the first switching element is rendered high-frequency conducting and non-conducting. The lamp is subsequently fed with a DC current. The operating voltage of the lamp La has such a value that no glow discharge is realized by this voltage in the glow discharge starter, so that the glow discharge starter S2 remains non-conducting after ignition of the lamp La. It is possible to measure the lamp current with means which are not shown in FIG. 1, compare it with a reference value and, in dependence upon the result of the comparison, adjust the frequency and/or the duty cycle of the switching element S1 via the circuit component SC. In this way, the amplitude of the DC current with which the lamp is fed is controlled at a substantially constant value.

Figure 2:
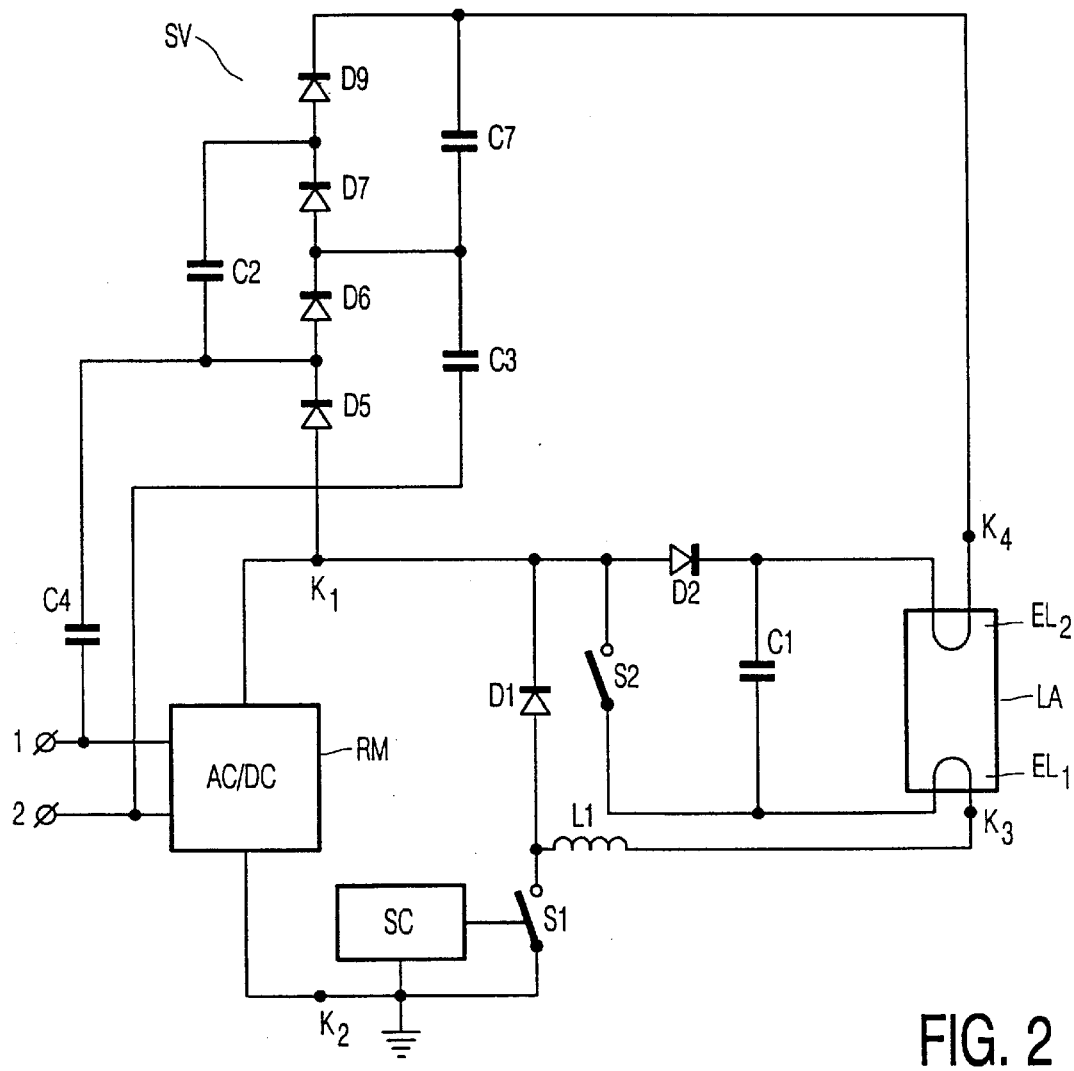
FIG. 2 shows diagrammatically a second embodiment of a circuit arrangement according to the invention, with a lamp connected thereto.

The embodiment shown in FIG. 2 differs from that in FIG. 1 only in that a voltage multiplier (SV) constituted by capacitors C2, C3, C4 and C7 and diodes D5, D6, D7 and D9 has been added. A first and a second output terminal of the voltage multiplier are connected to input terminal K1 and output terminal K4, respectively, of the down-converter. The first output terminal of the voltage multiplier is connected to the second output terminal by means of a series arrangement of diodes D5, D6, D7 and D9. Capacitor C7 shunts diodes D7 and D9. Capacitor C2 shunts diodes D6 and D7. Terminal 1 is connected via capacitor C4 to a common point of diodes D5 and D6. Terminal 2 is connected via capacitor C3 to a common point of diodes D6 and D7.

The structure of the circuit arrangement of FIG. 2 is similar to that shown in FIG. 1 and corresponding components and circuit sections have been denoted by the same reference symbols.

The operation of the embodiment shown in FIG. 2 corresponds to the operation of the embodiment shown in FIG. 1. The voltage multiplier generates an output voltage at a high amplitude from the AC voltage, which output voltage is present between input terminal K1 and output terminal K4. In the same manner as described above for the embodiment shown in FIG. 1, capacitor C1 is charged to a voltage at which the lamp ignites. Immediately after breakdown of the plasma in the lamp La, the high output voltage of the circuit section SV becomes available for generating a relatively high current through the lamp and thus favorably influencing take-over by the lamp. After the lamp has been ignited, the circuit arrangement shown in FIG. 2 operates in substantially the same way as the one shown in FIG. 1. Since the lamp voltage is relatively low during stationary operation and the lamp also takes up a relatively high current, the voltage multiplier SV is rendered substantially inactive during stationary lamp operation and thus does not generate a high output voltage during this phase of the lamp operation.

Figure 3:
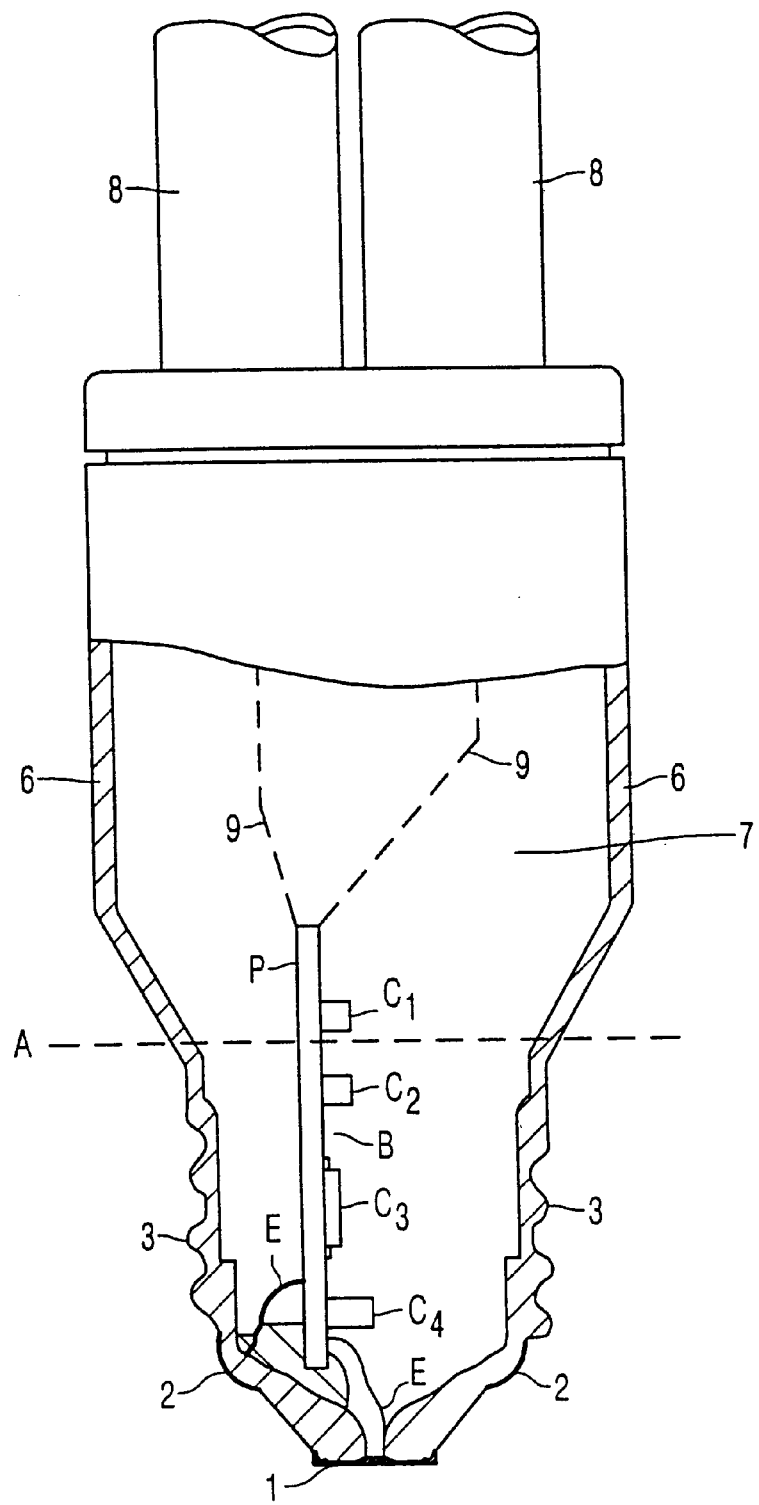
FIG. 3 shows a compact fluorescent lamp according to the invention.

In FIG. 3, the reference numeral 8 denotes a light-transmissive discharge vessel provided with a filling containing mercury and a rare gas, and two electrodes (not shown). A luminescent coating is provided on the wall of the discharge vessel. The reference numeral 6 denotes a lamp housing secured to the discharge vessel 8, and the reference numeral 3 denotes a lamp base provided with electric contacts (1 and 2) and secured to the lamp housing, and circuit sections P and C1–C4 diagrammatically represent a ballast circuit B according to the invention, coupled between the contacts (1, 2) via the conductors E and the electrodes (via conductors 9) for generating a DC lamp current from a power supply voltage.

What is claimed is:

1. A circuit arrangement for igniting and supplying a lamp with a DC current, comprising:
    input terminals for connection to terminals of a power supply source supplying a DC voltage,
    a DC/DC converter coupled to the input terminals and provided with an inductive element,
    a first unidirectional element,
    a first switching element,
    a control circuit coupled to a control electrode of the first switching element for rendering the first switching element conducting and non-conducting at a frequency f,
    output terminals for connecting the lamp, and
    an output capacitance shunting the lamp during operation, the circuit arrangement further comprising;
    a first branch connecting the output terminals during operation and comprising a second switching element rendered conducting and non-conducting, characterized in that the first branch includes a second unidirectional element.

2. A circuit arrangement as claimed in claim 1, wherein the DC/DC converter comprises a down-converter.

3. A circuit arrangement as claimed in claim 1, wherein the first and the second unidirectional element each comprise a diode.

4. A circuit arrangement as claimed in claim 1, wherein the second switching element comprises a glow discharge starter.

5. A circuit arrangement as claimed in claim 1, wherein the first branch comprises a lamp electrode during operation.

6. A circuit arrangement as claimed in claim 1, further comprising a voltage multiplier.

7. A circuit arrangement as claimed in claim 1, wherein the first switching element is rendered conducting and non-conducting by the control circuit in such a way that the inductive element conveys a continuous current prior to ignition of the lamp.

8. A circuit arrangement as claimed in claim 1, wherein the control circuit includes a circuit component for decreasing the frequency f of the first switching element after ignition of the lamp.

9. A compact lamp comprising:
    a light-transmissive discharge vessel having a filling of rare gas, and two electrodes,
    a lamp housing secured to the discharge vessel,
    a lamp base provided with electric contacts and secured to the lamp housing, and
    a ballast circuit coupled between the electric contacts and the lamp electrodes for generating a lamp current from a power supply voltage, characterized in that the ballast circuit comprises a circuit arrangement as claimed in claim 1.

10. A compact lamp as claimed in claim 9, which comprises a compact fluorescent lamp.

11. A circuit arrangement as claimed in claim 1 wherein the first branch and the output capacitance are connected in parallel to the output terminals.

12. A circuit arrangement as claimed in claim 1 wherein the second switching element and the second unidirectional element are connected in series circuit in the first branch and the first branch is coupled in parallel with the output capacitance.

13. A circuit arrangement as claimed in claim 1 wherein the switching frequency of the first switching element in relation to the switching frequency of the second switching element is chosen so that the inductive element carries a continuous current during the ignition phase of the lamp.

14. A circuit arrangement as claimed in claim 3 wherein the first diode and the first switching element are connected in a first series circuit across the input terminals,
    the second diode, the output terminals and the inductive element are connected in a second series circuit which is in parallel with the first diode, the second switching element is connected to a first input terminal and to a second output terminal, and the output capacitance is connected across the output terminals.

15. A circuit arrangement as claimed in claim 12 wherein the second unidirectional element is further connected between a first input terminal and a first output terminal and with a polarity so as to prevent discharge of the output capacitance via the second switching element when the second switching element is conducting.

16. A circuit arrangement as claimed in claim 12 wherein a first input terminal is connected is a second output terminal via the second switching element and a lamp electrode of a connected lamp, and the second output terminal is connected to the second input terminal via a second series circuit including the inductive element and the first switching element.

17. A circuit arrangement as claimed in claim 1 wherein the first unidirectional element and the first switching element are connected in a first series circuit across the input terminals, the second unidirectional element is polarized so as to prevent discharge of the output capacitance via the second switching element when the second switching element is conducting, and during lamp ignition the second switching element conveys a current from the input terminals to the inductive element via one lamp electrode of a connected lamp.

18. A circuit for igniting and operating a discharge lamp comprising:

first and second input terminals for connection to terminals of a source of DC supply voltage, first and second output terminals for connection to a discharge lamp, an output capacitance coupled across the first and second output terminals, a first diode and a first switching element connected in a first series circuit across the first and second input terminals, a control circuit coupled to a control electrode of the first switching element to make it alternately conduct and non-conduct at a frequency (f), a second diode and a second switching element connected in a second series circuit to the first and second output terminals and with the second diode polarized so as to prevent discharge of the output capacitance via the second switching element when the second switching element is conducting, and wherein, an inductive element is connected in circuit so that, during lamp ignition, when the second switching element is non-conducting a charge current for the output capacitance flows via the second diode and the inductive element, and when the second switching element is conducting the inductive element supplies a further charge current to the output capacitance via the first diode and the second diode.

19. A circuit as claimed in claim 18 wherein, during lamp ignition, when the second switching element is non-conducting, the charge current for the output capacitance also flows via a conducting first switching element.

20. A circuit as claimed in claim 19 wherein, during lamp ignition, the charge current for the output capacitance also flows via one electrode of a connected discharge lamp.

* * * * *